US011370972B2

(12) United States Patent
Sun et al.

(10) Patent No.: US 11,370,972 B2
(45) Date of Patent: Jun. 28, 2022

(54) FLAME-RETARDANT INSULATION BAR FOR WINDOWS AND DOORS

(71) Applicants: Byoung Wook Sun, Anseong-si (KR); ACE METAL CO., LTD., Anseong-si (KR)

(72) Inventors: Byoung Wook Sun, Anseong-si (KR); You Lack Choi, Hwaseong-si (KR)

(73) Assignees: Byoung Wook Sun, Anseong-si (KR); ACE METAL CO., LTD., Anseong-si (KR)

( * ) Notice: Subject to any disclaimer, the term of this patent is extended or adjusted under 35 U.S.C. 154(b) by 0 days.

(21) Appl. No.: 17/476,775

(22) Filed: Sep. 16, 2021

(65) Prior Publication Data

US 2022/0112428 A1 Apr. 14, 2022

(30) Foreign Application Priority Data

Oct. 12, 2020 (KR) ........................ 10-2020-0131076

(51) Int. Cl.

| | |
|---|---|
| ***C09K 21/12*** | (2006.01) |
| ***C08L 77/02*** | (2006.01) |
| ***C08L 77/06*** | (2006.01) |
| ***C09K 21/02*** | (2006.01) |
| ***C09K 21/08*** | (2006.01) |
| ***C09K 21/10*** | (2006.01) |
| ***E06B 3/263*** | (2006.01) |

(52) U.S. Cl.

CPC .............. *C09K 21/12* (2013.01); *C08L 77/02* (2013.01); *C08L 77/06* (2013.01); *C09K 21/02* (2013.01); *C09K 21/08* (2013.01); *C09K 21/10* (2013.01); *E06B 3/26303* (2013.01); *C08L 2201/02* (2013.01); *E06B 2003/26369* (2013.01); *E06B 2003/26394* (2013.01)

(58) Field of Classification Search

CPC ........ C09K 21/12; C09K 21/02; C09K 21/08; C09K 21/10; C08L 77/02; C08L 77/06; C08L 2201/02; E06B 3/26303; E06B 2003/26369; E06B 2003/26394

See application file for complete search history.

(56) References Cited

FOREIGN PATENT DOCUMENTS

| | | | | |
|---|---|---|---|---|
| JP | 2012211270 | A | * | 11/2012 |
| KR | 1019980040718 | A | | 8/1998 |
| KR | 1020040009053 | A | | 1/2004 |
| KR | 1020100070679 | A | | 6/2010 |
| KR | 1020170137173 | A | | 12/2017 |

OTHER PUBLICATIONS

English Translation of JP2012211270A (Year: 2012).*

* cited by examiner

*Primary Examiner* — Andrew J. Oyer
(74) *Attorney, Agent, or Firm* — Rabin & Berdo, P.C.

(57) ABSTRACT

Disclosed is a flame-retardant insulation bar manufactured by extruding an insulation composition including any one base resin selected from the group consisting of polyamide, polyurethane, polyester, and combinations thereof, a reinforcing agent, a flame retardant, and an additive.

2 Claims, No Drawings

FLAME-RETARDANT INSULATION BAR FOR WINDOWS AND DOORS

BACKGROUND OF THE INVENTION

Field of the Invention

The present invention relates to an insulation bar for windows and doors, and more particularly to a flame-retardant insulation bar for windows and doors.

Description of the Related Art

Windows and doors perform functions such as lighting, air circulation and the like by separating or interconnecting indoor and outdoor areas. Such windows and doors are generally composed of a window frame or door frame, corresponding to a skeleton, and a window or door coupled thereto.

Windows and doors are prone to breakage due to frequent opening and closing and thus require satisfactory mechanical properties. In addition, since they need to be processed into various shapes from an aesthetic aspect, products using metal materials such as aluminum, etc. or various synthetic resins are commercially available.

However, among various materials for windows and doors, aluminum is characterized by high heat conductivity of 160 W/m·K, which is problematic in the case in which the temperature difference between indoors and outdoors is high because the insulation effect thereof is poor and condensation readily occurs, and also because insulation effect, soundproofing effect, mechanical properties, etc. are deteriorated due to thermal deformation thereof. Accordingly, insulation frames formed between aluminum frames, or insulation bars filled with insulating materials such as Azon or polyamide, have been commercialized. The insulation bar may effectively prevent heat transfer by breaking a thermal bridge.

However, the present inventors have discovered a problem in that the material for the insulation bar is a weakness of the constitution of windows and doors when a fire occurs and thus it easily ignites. Since the insulation bar is in contact with glass or the like to effectively break a thermal bridge, glass may be detached in the event of loss of a portion of the insulation bar, creating a safety hazard.

Therefore, the present inventors have developed a technique for imparting flame retardancy while maintaining low heat conductivity, excellent mechanical properties, and high extrudability, which are the main characteristics of the material for insulation bars in consideration of the above, thus culminating in the present invention.

SUMMARY OF THE INVENTION

The present invention has been made keeping in mind the problems encountered in the related art, and an object of the present invention is to provide a flame-retardant insulation bar that not only has flame retardancy but also exhibits excellent insulation properties and mechanical properties, and a window and door including the same.

In order to accomplish the above object, an aspect of the present invention provides a flame-retardant insulation bar manufactured by extruding an insulation composition including any one base resin selected from the group consisting of polyamide, polyurethane, polyester, and combinations thereof, a reinforcing agent, a flame retardant, and an additive.

In an embodiment, the polyamide may be at least one selected from the group consisting of polyamide 6, polyamide 12, polyamide 66, polyamide 6/66, polyamide 6/12, polyamide 6/6T, polyamide 6/6I, and copolymers thereof, and may have a relative viscosity of 1.5 to 3.6.

In an embodiment, the polyurethane may have heat conductivity of 0.15 W/m·K or less.

In an embodiment, the reinforcing agent may be glass fiber having an aspect ratio of 400 or less but greater than 1.

In an embodiment, the flame retardant may include at least one selected from among an inorganic flame retardant, a halogen-based flame retardant, a phosphorus-based flame retardant, and a nitrogen-based flame retardant.

In an embodiment, the insulation composition may include 50 to 80 parts by weight of the base resin, 10 to 30 parts by weight of the glass fiber, 10 to 25 parts by weight of the flame retardant, and 5 to 15 parts by weight of the additive.

In an embodiment, the flame-retardant insulation bar may satisfy at least one of the following conditions (i) to (vii): (i) heat conductivity of 0.5 W/m·K or less, (ii) flexural strength of 2,000 kg/cm$^2$ or more, (iii) a flexural modulus of 50,000 kg/cm$^2$ or more, (iv) impact strength of 10 kg·cm/cm or more, (v) a melt index (280° C.) of 5 g/10 min or more, (vi) melt viscosity (100S$^{-1}$, 280° C.) of 5,000 Pa·S or more, and (vii) a UL94 flame-retardant grade of 5V, V-0, V-1, or V-2.

Another aspect of the present invention provides a flame-retardant insulation window and door including the flame-retardant insulation bar described above.

DETAILED DESCRIPTION OF THE INVENTION

Hereinafter, a detailed description will be given of a flame-retardant insulation bar and a flame-retardant insulation window and door according to the present invention. However, the following description is merely set forth so that the present invention can be more easily carried out through the embodiments of the present invention, and is not to be construed as limiting the scope of the present invention.

Flame-Retardant Insulation Bar

A flame-retardant insulation bar according to an aspect of the present invention may be manufactured by extruding an insulation composition including any one base resin selected from the group consisting of polyamide, polyurethane, polyester, and combinations thereof, a reinforcing agent, a flame retardant, and an additive.

The flame-retardant insulation bar includes a flame retardant and is thus capable of preventing a safety accident due to fire, unlike a conventional insulation bar. Also, the flame retardant serves to increase the viscosity of the insulation composition, impart flame retardancy to a final product, and improve strength.

In an embodiment of the present invention, the polyamide may be at least one selected from the group consisting of polyamide 6, polyamide 12, polyamide 66, polyamide 6/66, polyamide 6/12, polyamide 6/6T, polyamide 6/6I, and copolymers thereof.

The polyamide flame-retardant insulation bar may be extruded into a predetermined shape, post-processed, and inserted into an aluminum bar and used in that state, but the present invention is not limited thereto.

In another embodiment of the present invention, the polyamide may have a relative viscosity of 1.5 to 3.6. This relative viscosity may be the relative viscosity of 1 g of a polyamide resin component in 100 ml of 96% sulfuric acid at 20° C.

When the relative viscosity of the polyamide falls within the above range, it is possible to alleviate a problem in which the extrudability of the insulation composition is lowered due to the addition of the flame retardant.

The heat conductivity of the polyamide may be 0.40 W/m·K or less, for example, 0.40 W/m·K, 0.35 W/m·K, 0.30 W/m·K, or 0.25 W/m·K, but the present invention is not limited thereto.

In an embodiment of the present invention, the polyurethane has heat conductivity of 0.15 W/m·K or less, for example, 0.15 W/m·K, 0.14 W/m·K, 0.13 W/m·K, or 0.12 W/m·K, but the present invention is not limited thereto.

The polyurethane flame-retardant insulation bar may be manufactured by injecting a molten insulation composition into an aluminum bar, followed by a cutting process, but the present invention is not limited thereto. To this end, the relative viscosity of the polyurethane may be 3.6 or less but greater than 1.0, but the present invention is not limited thereto.

In an embodiment of the present invention, the reinforcing agent may be glass fiber having an aspect ratio of 400 or less but greater than 1. If the aspect ratio of the glass fiber falls out of the above range, the viscosity of the insulation composition may be unsuitable for extrusion molding, or the effect of the reinforcing agent on increasing impact resistance may be deteriorated.

In an embodiment of the present invention, the flame retardant may include at least one selected from among an inorganic flame retardant, a halogen-based flame retardant, a phosphorus-based flame retardant, and a nitrogen-based flame retardant.

The inorganic flame retardant may be at least one selected from the group consisting of red phosphorus, ammonium phosphate, ammonium polyphosphate, aluminum hydroxide, magnesium hydroxide, antimony trioxide, antimony tetraoxide, antimony pentoxide, sodium antimonate carbonate, metal antimony, antimony trichloride, antimony pentachloride, barium metaborate, zirconium oxide, zinc borate, zinc stannate, molybdate, and zirconium, but is not limited thereto.

This inorganic flame retardant serves primarily to perform a combustion reaction faster than the base resin to thus prevent detachment of glass due to breakage of the insulation bar, and secondarily to lower the temperature of the base resin by releasing $H_2O$ vapor and carrying out a dehydration reaction, which is endothermic. Also, the inorganic flame retardant may impart heat resistance by forming a surface protective layer after release of the $H_2O$ vapor.

The halogen-based flame retardant may be a chlorine-based flame retardant or a bromine-based flame retardant such as polybrominated diphenyl ether, tetrabromobisphenol A and derivatives thereof, polybrominated biphenyl, hexabromocyclododecane, or the like. The halogen-based flame retardant stabilizes active OH. and H. radicals due to a radical-trapping effect in which chlorine or bromine reacts first with radicals in a high-energy state, and blocks oxygen to impart flame retardancy.

The organophosphorus-based flame retardant may be at least one selected from the group consisting of phosphoric acid esters such as triphenyl phosphate, trixylenyl phosphate, tricresyl phosphate, and the like, resorcinol diphosphate, and ammonium polyphosphoric acid, but is not limited thereto. The organophosphorus-based flame retardant decomposes into phosphorus-based radicals upon combustion and reacts with OH. radicals to thus block the supply of oxygen and heat, thereby suppressing combustion.

The nitrogen-based flame retardant may be a melamine-based compound. The nitrogen-based flame retardant may prevent combustion of the insulation bar by lowering the temperature through an endothermic reaction and by foaming the surface through generation of nitrogen gas due to combustion.

The flame retardant may be either an additive flame retardant that is simply physically mixed with the base resin or a reactive flame retardant that chemically reacts with the base resin.

The additive may be a pigment for imparting a color to the insulation bar, an elastomer for improving mechanical strength, a flame-retardant aid for maximizing the performance of the flame retardant, and the like.

In an embodiment of the present invention, the insulation composition may include 50 to 80 parts by weight of the base resin, 10 to 30 parts by weight of the glass fiber, 10 to 45 parts by weight of the flame retardant, and 5 to 15 parts by weight of the additive. When the amounts of the components of the composition fall within the corresponding ranges above, it is possible to perform extrusion molding and realize superior physical properties compared to a conventional insulation bar. In particular, depending on the amount of the flame retardant, the mechanical strength may be improved compared to a conventional insulation bar.

In an embodiment of the present invention, the flame-retardant insulation bar may satisfy at least one of the following conditions (i) to (vii): (i) heat conductivity of 0.5 W/m·K or less, for example 0.5 W/m·K, 0.45 W/m·K, 0.40 W/m·K, 0.35 W/m·K, 0.30 W/m·K, 0.25 W/m·K, 0.20 W/m·K, 0.15 W/m·K, or 0.10 W/m·K; (ii) flexural strength of 2,000 $kg/cm^2$ or more, for example 2,000 $kg/cm^2$, 2,100 $kg/cm^2$, 2,200 $kg/cm^2$, 2,300 $kg/cm^2$, 2,400 $kg/cm^2$, 2,500 $kg/cm^2$, 2,600 $kg/cm^2$, 2,700 $kg/cm^2$, 2,800 $kg/cm^2$, 2,900 $kg/cm^2$, or 3,000 $kg/cm^2$; (iii) a flexural modulus of 50,000 $kg/cm^2$ or more, for example 50,000 $kg/cm^2$, 55,000 $kg/cm^2$, 60,000 $kg/cm^2$, 65,000 $kg/cm^2$, 70,000 $kg/cm^2$, 75,000 $kg/cm^2$, or 80,000 $kg/cm^2$; (iv) impact strength of 10 kg·cm/cm or more, for example 10 kg·cm/cm, 11 kg·cm/cm, 12 kg·cm/cm, kg·cm/cm, 14 kg·cm/cm, 15 kg·cm/cm, 16 kg·cm/cm, 17 kg·cm/cm, 18 kg·cm/cm, 19 kg·cm/cm, or 20 kg·cm/cm; (v) a melt index (280° C.) of 5 g/10 min or more, for example 5 g/10 min, 6 g/10 min, 7 g/10 min, 8 g/10 min, 9 g/10 min, 10 g/10 min, 11 g/10 min, 12 g/10 min, 13 g/10 min, 14 g/10 min, or 15 g/10 min; (vi) melt viscosity (100 $S^{-1}$, 280° C.) of 5,000 Pa·S or more, for example 5,000 Pa·S, 5,500 Pa·S, 6,000 Pa·S, 6,500 Pa·S, 7,000 Pa·S, or 7,500 Pa·S; and (vii) a UL94 flame retardant grade of 5V, V-0, V-1, or V-2.

The flame-retardant insulation bar may realize physical properties similar to those of the conventional bar, and simultaneously may exhibit an excellent UL94 flame-retardant grade of V-2 or higher.

Flame-Retardant Insulation Window and Door

Another aspect of the present invention pertains to a flame-retardant insulation window and door including the flame-retardant insulation bar described above.

The flame-retardant insulation window and door may include the flame-retardant insulation bar described above and an aluminum frame that is in contact with at least one surface of the heat-resistant insulation bar, but the present invention is not limited thereto.

The flame-retardant insulation bar may be applied to various types of windows and doors, and may be used for any structure that requires thermal bridge break.

Example 1

An insulation bar sample was manufactured by mixing parts by weight of polyamide having a relative viscosity of 1.5, 30 parts by weight of glass fiber, 20 parts by weight of magnesium hydroxide, and 10 parts by weight of a rubber and pigment admixture and extruding the resulting mixture using an extruder at 250 to 300° C.

Example 2

An insulation bar sample was manufactured by mixing parts by weight of polyamide having a relative viscosity of 3.6, 30 parts by weight of glass fiber, 20 parts by weight of magnesium hydroxide and 10 parts by weight of a rubber and pigment admixture and extruding the resulting mixture using an extruder at 250 to 300° C.

Example 3

An insulation bar sample was manufactured by mixing parts by weight of polyamide having a relative viscosity of 2.5, 30 parts by weight of glass fiber, 20 parts by weight of decabromodiphenyl ether, and 10 parts by weight of a rubber and pigment admixture and extruding the resulting mixture using an extruder at 250 to 300° C.

Example 4

An insulation bar sample was manufactured by mixing 60 parts by weight of polyamide having a relative viscosity of 2.5, 30 parts by weight of glass fiber, 20 parts by weight of triphenyl phosphate, and 10 parts by weight of a rubber and pigment admixture and extruding the resulting mixture using an extruder at 250 to 300° C.

Example 5

An insulation bar sample was manufactured by mixing parts by weight of polyamide having a relative viscosity of 2.5, 30 parts by weight of glass fiber, 20 parts by weight of melamine cyanurate, and 10 parts by weight of a rubber and pigment admixture and extruding the resulting mixture using an extruder at 250 to 300° C.

Comparative Example 1

An insulation bar sample was manufactured by mixing parts by weight of polyamide 66 having a relative viscosity of 2.5, 30 parts by weight of glass fiber, and 10 parts by weight of a rubber and pigment admixture and extruding the resulting mixture using an extruder at 250 to 300° C.

Comparative Example 2

60 parts by weight of polyamide having a relative viscosity of 3.8, 30 parts by weight of glass fiber, 20 parts by weight of magnesium hydroxide, and 10 parts by weight of a rubber and pigment admixture were mixed, and the resulting mixture was subjected to extrusion using an extruder at 250 to 300° C., but it was not possible to extrude the product from the extruder.

Comparative Example 3

An insulation bar sample was manufactured by mixing 40 parts by weight of polyamide with a relative viscosity of 1.5, 30 parts by weight of glass fiber, 60 parts by weight of magnesium hydroxide, and 10 parts by weight of a rubber and pigment admixture and extruding the resulting mixture using an extruder at 250 to 300° C.

Test Example

The properties of the insulation bar samples manufactured in Examples 1 to 5 and Comparative Example 1 and 3 were measured, and the results thereof are shown in Table 1 below.

The samples had a length×width×thickness of 125×13×10 mm, and the flame retardancy thereof was measured based on the measurement conditions of UL94.

The mechanical properties of each sample were proportionally assigned as higher values when superior to Comparative Example 1 as a reference (100), and as lower values when inferior thereto.

TABLE 1

| Classification | Example 1 | Example 2 | Example 3 | Example 4 | Example 5 | Comparative Example 1 | Comparative Example 3 |
|---|---|---|---|---|---|---|---|
| Flame retardancy (UL94) | V-1 | V-1 | V-0 | V-1 | V-1 | Ignition | V-0 |
| Heat conductivity | 99 | 102 | 101 | 102 | 103 | 100 | 93 |
| Flexural strength | 97 | 94 | 101 | 103 | 102 | 100 | 88 |
| Flexural modulus | 96 | 94 | 100 | 101 | 102 | 100 | 71 |
| Impact strength | 104 | 107 | 105 | 104 | 104 | 100 | 77 |

As is apparent from Table 1, the sample of Comparative Example 1, which did not include a flame retardant, did not exhibit flame retardancy because the afterflame time exceeded 30 seconds, but Examples 1 to 5 all exhibited flame retardancy.

Moreover, according to Examples 1 to 5, each flame retardant was effective at decreasing heat conductivity and increasing mechanical strength, in addition to imparting flame retardancy.

The sample of Comparative Example 1 was a product having heat conductivity of 0.30 W/m·K, flexural strength of 2,100 kg/cm$^2$, a flexural modulus of 67,000 kg/cm$^2$, and impact strength of 14 kg·cm/cm, and each Example was capable of exhibiting physical properties similar or superior thereto.

Comparative Example 3, in which the amount of the flame retardant was much greater than the amount of the base resin, had excellent flame retardancy, but had poor mechanical properties and heat conductivity. The mechanism of action thereof has not been confirmed, but it is assumed that the mechanical strength thereof was drastically deteriorated due to poor dispersibility of the flame retardant and that heat conductivity was increased due to the flame retardant.

As is apparent from the above description, the flame-retardant insulation bar and the flame-retardant insulation window and door according to the present invention have excellent insulation properties and mechanical properties, and simultaneously exhibit flame retardancy, thereby reducing the risk of fire.

The effects of the present invention are not limited to the foregoing, and should be understood to include all effects that may be reasonably anticipated from the configuration of the invention described in the detailed description or claims of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A flame-retardant insulation bar manufactured by extruding an insulation composition at 250 to 300° C., comprising:

60 parts by weight of a polyamide base resin;

30 parts by weight of a reinforcing agent;

20 parts by weight of an organophosphorus-based flame retardant; and 10 parts by weight of an additive, wherein an amount of the polyamide base resin is at least half of a total amount of the insulation composition, the polyamide base resin is consisted of at least one selected from the group consisting of polyamide 6, polyamide 12, polyamide 66, polyamide 6/66, polyamide 6/12, polyamide 6/6T, polyamide 6/6I, and copolymers thereof, has a relative viscosity of 2.0, and has heat conductivity of 0.40 W/m·K or less, wherein the relative viscosity is based on 1 g of the polyamide base resin in 100 ml of 96% sulfuric acid at 20° C., the reinforcing agent is a glass fiber having an aspect ratio of 400 or less but greater than 1, the organophosphorus-based flame retardant is triphenyl phosphate, and the flame-retardant insulation bar has heat conductivity of 0.5 W/m·K or less and a UL94 flame-retardant grade of V-2 or higher, and satisfies at least one of following conditions (i) to (v):

(i) a flexural strength of 2,000 $kg/cm^2$ or more;

(ii) a flexural modulus of 50,000 $kg/cm^2$ or more;

(iii) an impact strength 10 kg·cm/cm or more;

(iv) a melt index (280° C.) of 5 g/10 min or more; and (v) a melt viscosity (100 $S^{-1}$, 280° C.) of 5,000 Pa·S or more.

2. A flame-retardant insulation window and door comprising the flame-retardant insulation bar according to claim 1.

* * * * *